April 14, 1953 L. ENZINGER ET AL 2,634,921
CABLE POSITIONING MECHANISM
Filed April 3, 1950 4 Sheets-Sheet 1
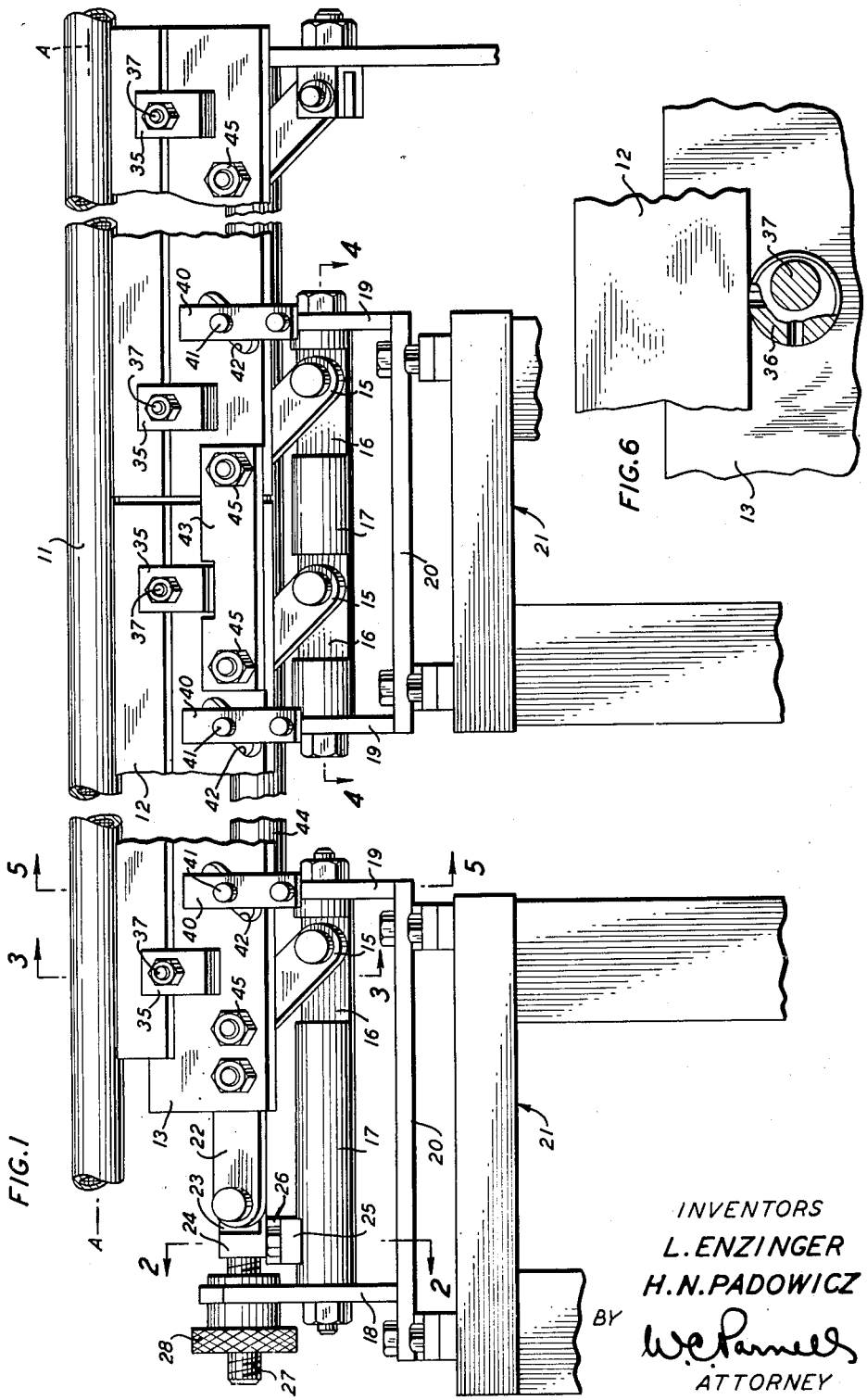
INVENTORS
L. ENZINGER
H. N. PADOWICZ
BY
W. E. Parnell
ATTORNEY

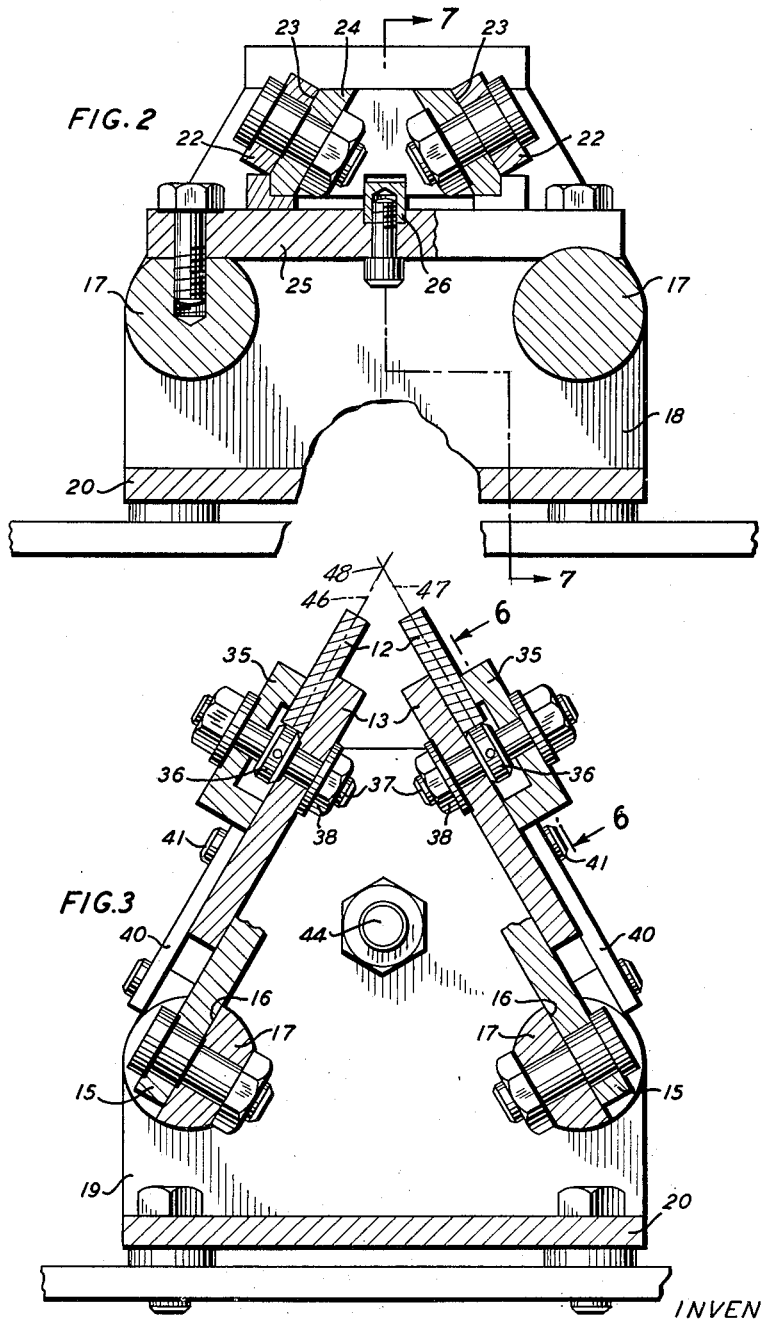

April 14, 1953 L. ENZINGER ET AL 2,634,921
CABLE POSITIONING MECHANISM
Filed April 3, 1950 4 Sheets-Sheet 3

INVENTORS
L. ENZINGER
H. N. PADOWICZ
BY
ATTORNEY

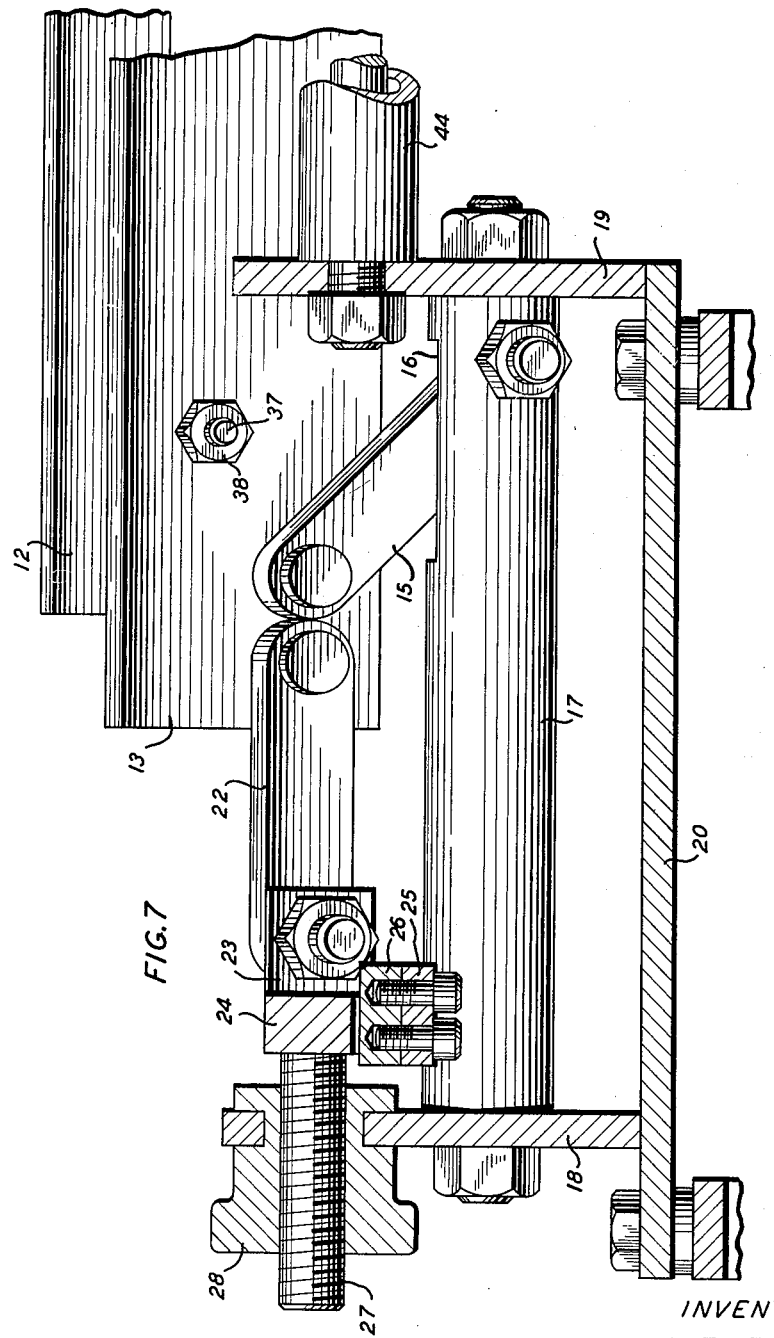

Patented Apr. 14, 1953

2,634,921

UNITED STATES PATENT OFFICE 2,634,921

CABLE POSITIONING MECHANISM

Leonhard Enzinger, Brooklyn, N. Y., and Henry N. Padowicz, Livingston, N. J., assignors to Western Electric Company, Incorporated, New York, N. Y., a corporation of New York Application April 3, 1950, Serial No. 153,726

5 Claims. (Cl. 242—157)

This invention relates to positioning mechanisms and more particularly to a mechanism of this type used to position a cable undergoing manufacture.

Large scale production of electrical cable requires that the equipment for manufacturing the cable be placed in tandem arrangement. This straight line set up necessitates maintaining the cable on a prescribed axial line as it passes through the manufacturing apparatus, and where this alignment is not accomplished by the apparatus itself, special positioning means must be provided. When the cable has a corrugated metallic sheathing whose edges are to be soldered or similarly joined together, alignment where the cable passes through the joining equipment is especially important if proper registration of the sheathing corrugations and the most efficient heat transfer is to be obtained. In addition, any positioning mechanism used should be designed to accommodate various diameters of cable.

It is therefore an object of this invention to provide means for properly positioning various sizes of cable along a prescribed axial line during the course of their manufacture.

In the preferred embodiment of the invention, applicant accomplishes his object by mounting a cable to be manufactured on the edges of two plates which are raised or lowered simultaneously by a parallelogram mounting structure actuated by a single knob. The two supporting plates are inclined toward each other at equal angles such that their central planes intersect along the desired axial center line of the cable. Each plate moves in its own inclined plane so that by proper adjustment of the knob, cables or different sizes may be supported with their axes at the same level.

Other objects and advantages will be apparent from the following detailed description taken in conjunction with the attached drawings in which:

Fig. 1 is a front elevational view of the entire positioning mechanism;

Fig. 2 is a sectional view of the actuating means for the mechanism, taken along the line 2—2 of Fig. 1;

Fig. 3 is a sectional view of the positioning elements, taken along the line 3—3 of Fig. 1;

Fig. 6 is a view of the cam device for making final positional changes in the supporting plates, taken along the line 6—6 of Fig. 3;

Fig. 7 is another view of the actuating means for the positioning plates, taken along the line 7—7 of Fig. 2.

Figure 4:
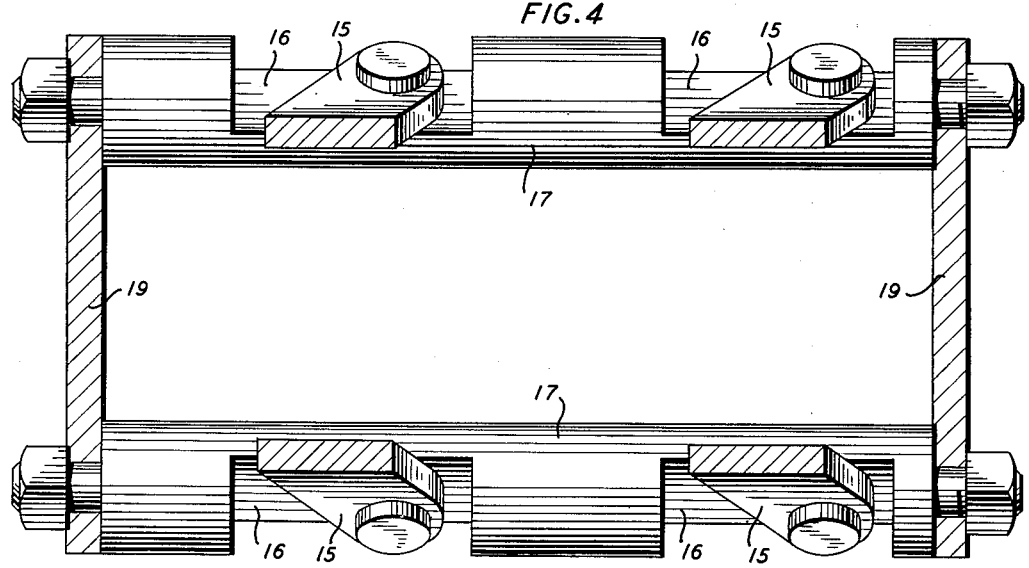
Fig. 4 is a sectional view of the linkage for the positioning plates, taken along the line 4—4 of Fig. 1.

With reference to the drawings, a cable 11 undergoing manufacture is required to have its central axis maintained on the axial line A—A. The actual positioning of the cable is done by the strips 12, which serve as extensions of corresponding positioning plates 13, with the cable resting on the upper edges of these strips. The plates 13 are held against spacing brackets 19 which cause them to be inclined toward each other at equal angles with the vertical, and are supported at regular intervals along their length by a plurality of identical links 15 which are pivotally mounted on the bottom portion of the plates through suitable bolting and are also pivotally mounted on a flat recessed portion 16 of arms 17. These arms 17, of which there are a pair at each supporting location, are positioned between vertical brackets 18 and 19, the brackets being welded to a support 20. The supports 20 are in turn suitably mounted on bases generally designated as 21.

Each plate 13 at the left end of the positioning mechanism, looking at Fig. 1, has pivotally connected thereto a link 22 corresponding generally to the links 15. The other ends of the links 22 are pivotally mounted on inclined surfaces 23 of a head block 24, which is slidably mounted on a crossbar 25, its movement being guided by a key 26. The head block 24 is formed integral with a threaded shaft 27 which passes through and is supported by a knurled knob 28 rotatably mounted in the end bracket 18. The knob 28 is threaded on the shaft 27 so that turning of the knob will cause the shaft to move horizontally.

It will thus be seen that the positioning plates 13 are supported jointly by the links 15 extending below them and by the links 22 at the left end of the positioning mechanism. This structure is designed so that the links 15 are all parallel to each other with the result that a positioning plate, any pair of its links 15, and the link supports form a parallelogram, the angularity of whose sides is variable by virtue of the pivotal mounting of all of the links 15. The angularity and area of these parallelograms, and thereby the vertical position of the positioning plates 13, which correspond to the top side of the parallelogram, may be varied by moving the head 24 horizontally in either direction to exert a force against the plates 13 through the links 22. This movement of the head 24 is accomplished by the turning of knob 28 which imparts horizontal movement to the threaded shaft 27 which is rigid with the head 24.

With reference to Fig. 3, it will be seen that the strips 12 on whose upper edges the cable is placed, are slidably mounted in openings formed between the positioning plates 13 and cleats 35. The strips may be individually moved up and down independent of the movement of the plates 13 by means of cams 36 rigidly mounted on studs 37. These bolts pass through the cleats 35 and plates 13 and are secured on their inner sides by nuts 38.

One of the main features of the invention is the mounting of the positioning plates 13 and their associated strips 12 so that the central planes 46 and 47 of the strips intersect at a line 48 which is the required axial center line of the cable being manufactured. Since all movement of the strips 12 takes place in planes which pass through the required axial center line, the position of the two strips may be simultaneously varied by means of the knob 28 to accommodate cables of varying diameters.

In the actual operation of the mechanism, the positioning plates and their strips are moved together to approximately their final position by turning the knob 28 in the appropriate direction, and the nuts 45 are then tightened to aid in holding the plates in this position. The cable core 11 is next placed on the upper edges of the strips 12 along the length of the mechanism so as to be supported thereon. The nuts 38 are then loosened and the individual strips 12 moved by turning the cams 36 until the center line of the cable is brought to the required axial line.

Figure 5:
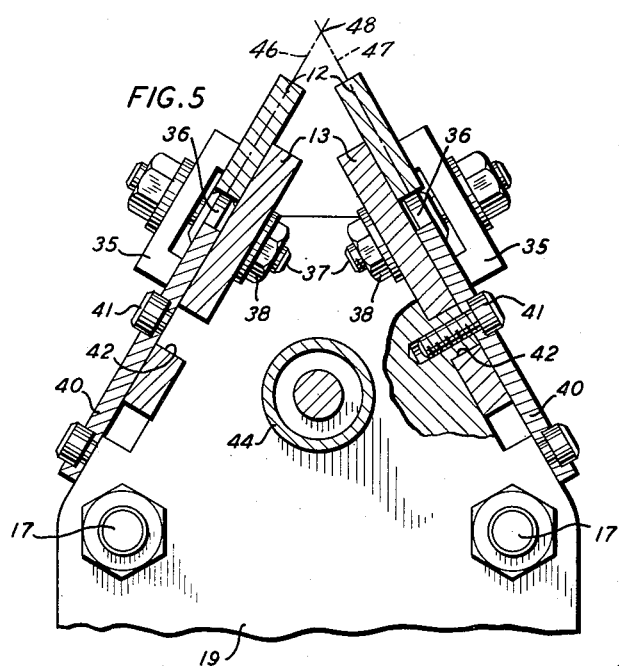
Fig. 5 is another sectional view of the positioning elements, taken along the line 5—5 of Fig. 1.

Vertical brackets 19 are used to position the plates and their strips so that the central planes of the strips are at equal angles to the vertical and intersect at the desired line. With reference to Figs. 1 and 5, the plates 13 are held in place against the edges of the brackets 19 by means of bars 40 which are bolted to the edge of the bracket in two places as shown. The upper bolt 41 is positioned in an angular slot 42 of the plate 13 as it passes through the plate, which enables the plate to be held firmly against the edge of the bracket 19 at the same time that it is moving angularly with respect to the bracket.

Although Fig. 1 shows two plates 13 on each side, joined by a connector 43, the entire length of the plates could be made in one piece should this prove practical. In addition, in a simplified form of the invention, the cable could be mounted and supported directly on the upper edges of the plates 13. A tie rod 44 serves as a connection between successive brackets 19 to provide rigidity for the assembly.

The invention as herein presented provides a simple, inexpensive and compact means for supporting and positioning varying diameters of cable along a required axial line, with changes in position being made simultaneously by the turning of a single actuating knob. This mechanism is of particular advantage in positioning a cable when the cable sheath is being joined in induction soldering or similar equipment, as it enables a uniform predicted heat distribution to be maintained in this operation, and also maintains the registration of the overlapped corrugations.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a positioning mechanism, two members for supporting on their top edges a cable undergoing manufacture, said members being inclined toward each other at fixed angles and having central planes converging at the top and intersecting substantially along a prescribed axial line for the cable, the top edges of said members being parallel to and equally spaced from said prescribed line, means for supporting the members for movement toward and away from said axial line while maintaining their fixed angles of inclination, said means including a fixed arm for each member, a plurality of links pivotally connecting the arms to the members and means for simultaneously moving the members by equal increments.

2. In a positioning mechanism, two members for supporting on their top edges a cable undergoing manufacture, said members being inclined toward each other at fixed angles and having central planes converging at the top and intersecting substantially along a prescribed axial line for the cable, the top edges of said members being parallel to and equally spaced from said prescribed line, means for supporting the members for movement toward and away from said axial line while maintaining their fixed angles of inclination, said means including a fixed arm for each member, a plurality of links pivotally connecting the arms to the members, means for simultaneously moving the members by equal increments including a block adjacent one end of the members, a linking arm pivotally mounted at said end of each member with both linking arms having their other ends pivotally mounted on the block, and means for moving the block in a direction parallel to said axial line.

3. In a positioning mechanism, two members each having a bearing strip for supporting on their top edges a cable undergoing manufacture, said members and strips being inclined toward each other at fixed angles, the strips having central planes converging at the top and intersecting substantially along a prescribed axial line for the cable, the top edges of said strips being parallel to and equally spaced from said prescribed line, means for supporting the members for movement toward and away from said axial line while maintaining their fixed angles of inclination, said means including a fixed arm for each member, a plurality of links pivotally connecting the arms to the members, means for simultaneously moving the members by equal increments and means for adjusting each bearing strip toward and away from said axial line independently of the movement of the members.

4. In a positioning mechanism, two members each having a bearing strip for supporting on their top edges a cable undergoing manufacture, said members and strips being inclined toward each other at fixed angles, the strips having central planes converging at the top and intersecting substantially along a prescribed axial line for the cable, the top edges of said strips being parallel to and equally spaced from said prescribed line, means for supporting the members for movement toward and away from said axial line while maintaining their fixed angles of inclination, said means including a fixed arm for each member, a plurality of links pivotally connecting the arms to the members, means for simultaneously moving the arms by equal increments including a block adjacent one end of the members, a linking arm pivotally mounted at said end of each member with both linking arms having their other ends pivotally mounted on the block, means for moving the block in a direction parallel to said axial line and camming means for individually adjusting each bearing strip toward and away from said axial line independently of the movement of the members.

5. In a positioning mechanism, a plurality of members disposed in laterally opposed pairs, each member having a bearing strip, for supporting on their top edges a cable undergoing manufacture, the opposed members and strips being inclined toward each other at fixed angles, the strips having central planes converging at the top and intersecting substantially along a prescribed axial line for the cable, the top edges of the opposed strips being parallel to and equally spaced from said prescribed line, means for supporting the members for movement toward and away from said axial line while maintaining their fixed angles of inclination, said means including a fixed arm for each member, a plurality of links pivotally connecting the arms to each member, means for simultaneously moving all of the members by equal increments and means for individually adjusting each strip on its member to align the supporting edges.

LEONHARD ENZINGER.
HENRY N. PADOWICZ.

References Cited in the file of this patent

UNITED STATES PATENTS

| Number | Name | Date |
|---|---|---|
| 1,754,810 | Wappler | Apr. 15, 1930 |
| 2,174,754 | Miller | Oct. 3, 1939 |
| 2,322,368 | Lacey | June 22, 1943 |